United States Patent
Yan (10) Patent No.: US 8,120,660 B2
(45) Date of Patent: Feb. 21, 2012

(54) IMAGE DATA UP SAMPLING

(75) Inventor: Yong Yan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1031 days.

(21) Appl. No.: 11/774,690

(22) Filed: Jul. 9, 2007

(65) Prior Publication Data

US 2008/0008249 A1 Jan. 10, 2008

Related U.S. Application Data

(60) Provisional application No. 60/806,909, filed on Jul. 10, 2006.

(51) Int. Cl.
*H04N 5/228* (2006.01)
(52) U.S. Cl. .................... 348/208.5; 348/222.1
(58) Field of Classification Search ........... 348/208.5, 348/222.1
See application file for complete search history.

(56) References Cited

U.S. PATENT DOCUMENTS

| 5,757,423 A * | 5/1998 | Tanaka et al. ........... 348/218.1 |
| 2004/0159773 A1* | 8/2004 | Fein et al. ................ 250/208.1 |
| 2005/0093895 A1* | 5/2005 | Damera-Venkata ........ 345/698 |
| 2007/0041663 A1* | 2/2007 | Cho et al. ................. 382/299 |

OTHER PUBLICATIONS

Kazushi Sato, Teruhiko Suzuki and Yoichi Yagasaki, "Adaptive MC Interpolation Filter for Complexity Reduction", JVT-C052r1, Failfax, VA, USA, May 6-10, 2002.
Arild Fuldseth, "Evaluation of Adaptive Interpolation Filter for realtime Applications", JVT-C057, Fairfax, VA, USA, May 6-10, 2002.

* cited by examiner

*Primary Examiner* — Usman Khan
(74) *Attorney, Agent, or Firm* — David G. Dolezal (57) ABSTRACT

Forming image information of image units (e.g. pixels) of a higher resolution by convoluting information of image units of a lower resolution with coefficients of a multiphase filter. The information of one set of higher resolution image units is formed by convoluting in a first direction the information of the lower resolution image units with a first set of four coefficients. The information of a second set of higher resolution image units is form by convoluting in the first direction the information of the lower resolution image units with a second set of four coefficients. Convolution may also be performed in a second direction with a set of four coefficients. In one example, the image information formed includes intensity information for each image unit.

20 Claims, 5 Drawing Sheets

IMAGE DATA UP SAMPLING

BACKGROUND OF THE INVENTION

1. Field of the Invention

This invention relates in data processing and more specifically for a filter for image data up sampling.

2. Description of the Related Art

In some examples of spatial scalable video coding, predictions between different coding layers are utilized to improve performance. In particular, inter layer prediction from a lower resolution base layer to a higher resolution enhancement layer may be utilized for improving coding efficiency on the enhancement layer. Texture inter layer prediction may be done by up sampling using a low-pass filter to avoid aliasing and imaging. Currently, a fixed filter with a one dimensional (1D) 6-tap filter component may be used for low pass filtering.

A filter with a 1D 4-tap filter component may be utilized for re-sampling. However, these conventional filters do not provide the same or nearly the same coding efficiency as a filter with a 1D 6-tap filter component.

Extended Spatial Scalability (ESS) has been implemented to unite dyadic (power of 2) and non-dyadic image resolution re-sampling. To remove the phase shift of dyadic resampling, luma down-sampling is performed at ½ phase and up sampling is performed at +¼ phase and −¼ phase. The 1D 6-tap filter component utilizes coefficients of [1, −4, 28, 9, −2, 0] for the +¼ phase and coefficients of [0, −2, 9, 28, −4, 1] for −¼ for both the horizontal and vertical dimensions of two dimensional (2D) images.

What is desired is an improved filter for image data up sampling.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

In some embodiments, a filter with a 1D 4-tap filter component is utilized for inter-layer texture up sampling. This filter may be used in place of a conventional filter with a 1D 6-tap filter component for complexity reduction for scalable video coding. In some embodiments, the 1D 4-tap filter component provides for a lower complexity video image re-sampling filtering method with polyphase implementations. In some embodiments, the 1D 4-tap filter component may be used for image up-sampling for inter-layer texture predictions from the lower resolution base layer to the higher resolution enhancement layer.

Figure 1:
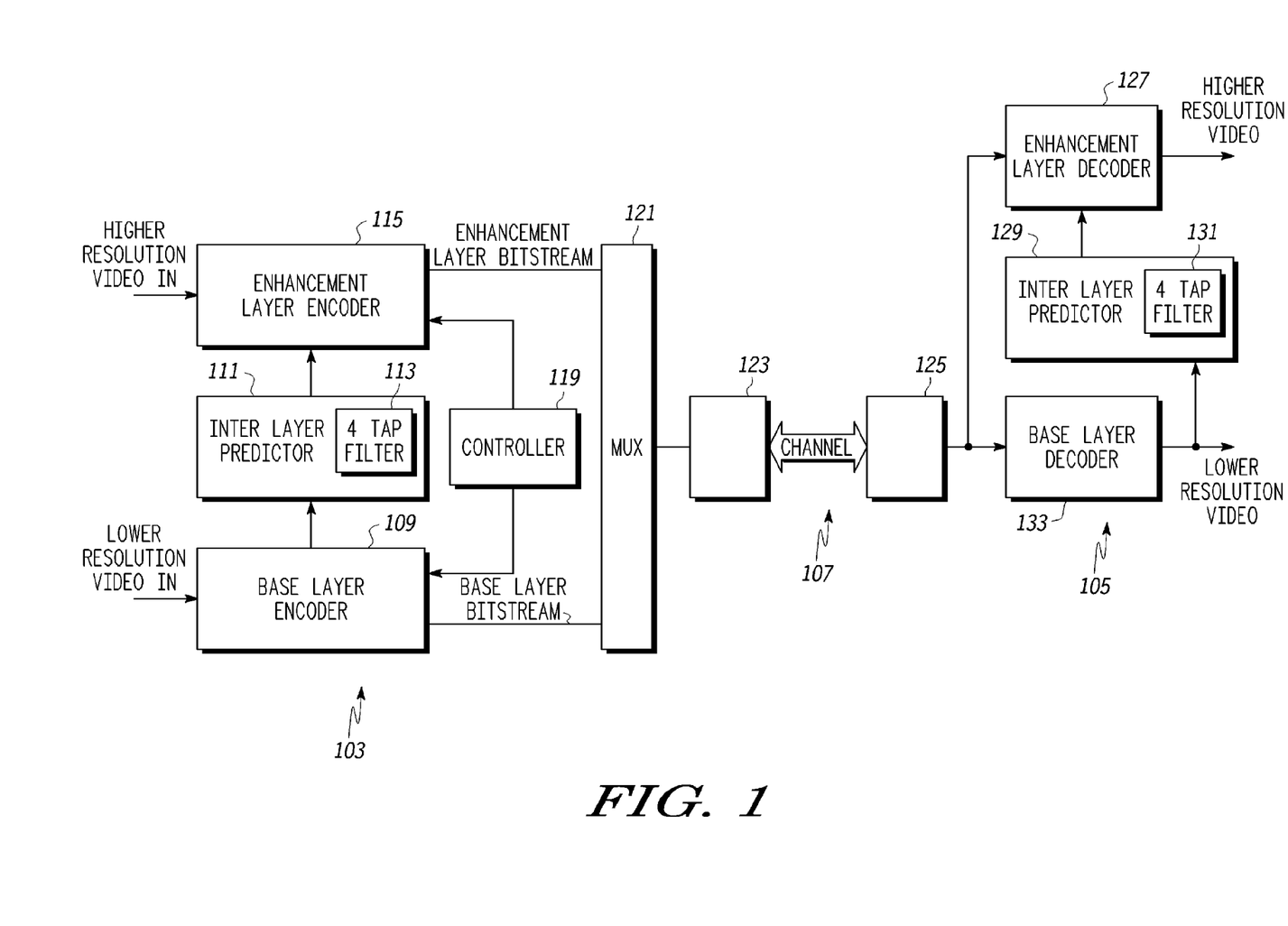
FIG. 1 is a block diagram of one embodiment of a video data encoding system and a video data decoding system communicatively coupled by a communications channel according to one embodiment of the present invention.

FIG. 1 is a block diagram of one embodiment of a video data encoding system 103 and a video data decoding system 105 communicatively coupled by a communications channel 107. Encoding system 103 and decoding system 105 may each be implemented in a communication device e.g. a cellular hand set, PDA, computer system, modem, base station, or set top box. Channel 107 may be wireless (WiFi, cellular, wireless broadband, satellite), wire line (e.g. phone, fiber, Ethernet, cable, LAN, WAN) or combination thereof. In one embodiment, systems 103 and 105 maybe implemented in electronic devices communicatively coupled to communication devices.

System 103 includes a base layer encoder 109 that receives lower resolution video sequences (Lower Resolution Video In). In one embodiment, the sequences have an image resolution of QCIF, 176×144 pixels. In some example, the lower resolution video sequence are provided by down sampling from an even higher resolution video sequence (e.g. CIF, 352×288 pixels). In one example, the sequence contains image information provided by a video camera. Base layer encoder 109 encodes the lower resolution video sequences into a lower resolution base layer bit stream. In one embodiment, the encoding complies with the H.264 ITU standard.

Encoding system 103 also includes a higher resolution video encoder 115 for encoding a higher image resolution video sequences (Video In) to an enhancement layer bit stream. In one embodiment, the higher resolution video sequences are produced by a video camera. In other embodiments, the higher resolution video sequences may be down sampled from a still higher resolution video sequences (e.g. produced by a video camera). In one embodiment, system 103 may include higher resolution encoders (not shown) for providing higher resolution enhancement layers.

System 103 also includes a controller 119 for bit rate control of the two encoders 109 and 115 and a MUX 121 for selecting between the base layer bit stream and the enhancement layer bit stream. System 103 also includes circuitry 123 for transforming, transmitting, and/or storing for transmitting the bit stream output of MUX 121 over channel 107. In some embodiments, circuitry 123 includes a modulator, antenna, transmitter, and/or memory. In one embodiment, system 103 may transmit both the base layer and enhancement layer stream across channel 107.

System 103 includes an interlayer predictor 111 that provides interlayer prediction information from base layer encoder 109 to enhancement layer encoder 115. In one embodiment, the prediction information includes texture information. In one embodiment, this prediction information may allow for the encoding of a frame or macro block of image data by encoder 115 using the prediction information generated from the lower resolution video sequences. In one embodiment, base layer 109 reconstructs frames, macro blocks, or other image data units from the lower resolution video sequences and provides those to interlayer predictor 111.

Interlayer predictor 111 performs interpolation of the lower resolution images to higher resolution images and provides these images to the higher resolution encoder. The enhancement layer encoder 115 uses these up sampled higher resolution images from predictor 111 as a prediction of the images conveyed by the higher resolution video sequences.

Interlayer predictor 111 includes a low pass filter 113 that is utilized for inter-layer texture up sampling. In one embodiment, low pass filter 113 is utilized for avoiding aliasing and imaging problems during interpolation (up sampling). In one embodiment, filter 113 is a Finite Impulse Response (FIR) filter. In one embodiment, filter 113 includes a 1D 4-tap filter component. In one embodiment, filter 113 is a poly phase (e.g. 2, 3, or 4 phase) filter. In one embodiment, filter 113 is a 2 dimensional (2D) separable filter. In one embodiment, the 2D separable filter has the identical one dimensional (1D) components for both the horizontal and vertical dimensions. In one embodiment, filter 113 is a 2D non separable 2D 16 tap filter.

System 105 includes bit stream extractor circuitry 125 for extracting a bit stream from the signals received from communication channel 107. In one embodiment, circuitry 125 includes an antennae, receiver, modem, and/or channel decoder. The bit stream produced by circuitry 125 is provided to base layer decoder 133 and enhancement layer decoder 127.

Base layer decoder 133 decodes the bit stream from circuitry 125 and reconstructs the lower resolution video. The lower resolution video is also provided to interlayer predictor 129. Predictor 129 processes the lower resolution video and generates higher resolution video images and provides that information to enhancement layer decoder 127. Enhancement layer decoder 127 uses the image information for prediction of the video frame, macro block, or other image data unit of the enhancement layer. The enhancement layer decoder 127 provides reconstructed higher resolution video. Either the lower or higher resolution video may be displayed on a display device (not shown).

Interlayer predictor 129 includes a low pass filter 131. In one embodiment, low pass filter 131 is utilized for avoiding aliasing and imaging problems during interpolation (up sampling). In one embodiment, filter 131 is a Finite Impulse Response (FIR) filter. In one embodiment, filter 131 includes a 1D 4-tap filter component. In one embodiment, filter 131 is a poly phase (e.g. 2, 3, or 4 phase) filter. In one embodiment, filter 113 is a 2 dimensional (2D) separable filter. In one embodiment, the 2D separable filter has the identical one dimensional (1D) components for both the horizontal and vertical dimensions. In one embodiment, filter 131 is a 2D non separable 2D 16 tap filter.

In some embodiments, system 105 may include even higher resolution layers (not shown). In such embodiments, both system 103 and system 105 may include other interlayer predictors for providing images from lower layer encoders or decoders to higher layer encoders or decoders for e.g. prediction.

The various blocks shown in FIG. 1 including filters 113 and 131 maybe implemented in hardware, software, firmware, or combinations thereof. Other encoding and decoding systems may have other configurations in other embodiments.

Figure 2:
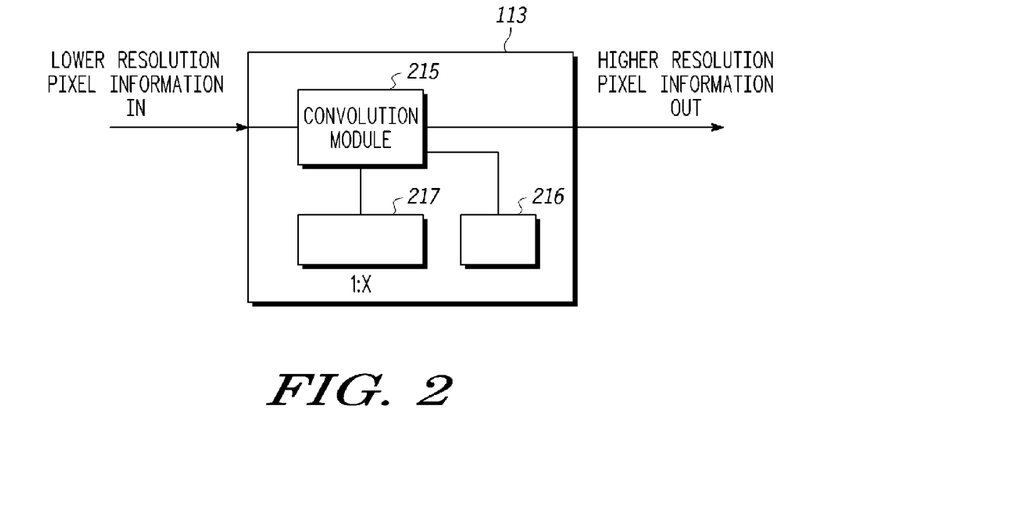
FIG. 2 is a block diagram of a filter according to one embodiment of the present invention.

FIG. 2 shows a block diagram of one embodiment of filter 113. In one embodiment, filter 131 is of the same configuration. In the embodiment shown, filter 113 receives data regarding lower resolution pixel information and outputs higher resolution pixel information. Filter 113 is a 1:X filter in that it interpolates information for more pixels per image than received at its input. In one embodiment, filter 113 is a 1:4 filter that outputs 4 pixels for each received pixel in a 2D dimension.

In one embodiment, the information for each pixel received by filter 113 includes an intensity value (e.g. Luma value) of the pixel. In other embodiments, the information for each pixel may include one or more color values (Croma U and Croma V). In some embodiments the pixel information includes all three values and/or other types of values.

Filter 113 includes a 2D convolution module 215 for convoluting the pixel information with coefficients (e.g. stored in registers 217) to form higher resolution pixel information. In one embodiment, convolution module 215 is a 2D, separable filter with identical 1D horizontal and vertical coefficients for both an X (e.g. horizontal), and a Y (e.g. vertical), dimension. In one embodiment, the filtering order is first on a horizontal dimension and then on a vertical dimension for both encoder and decoder. In another embodiment, the order is first on a vertical dimension and then on a horizontal dimension.

In one embodiment, filter 113 is a 2D, separable filter using the same tap of coefficients for both X (e.g. horizontal) and Y (e.g. vertical) dimensions. In other embodiments, to avoid mismatch between the encoder and decoder, the filtering order is the same. In one embodiment, the horizontal image data is up sampled first, the results are saved as a temporary image (e.g. in memory 216), and then the temporary image data are up sampled in a vertical dimension. The final resulting image is the up sampled higher resolution image. In other embodiments, the encoder and decoder may start up sample the 2D image data from the vertical dimension and then horizontal dimension.

In one embodiment, the 2D, separable convolution module 215 includes two convolutors, one for convoluting the information for the $+\frac{1}{4}$ phase pixels and the other for convoluting the information for the $-\frac{1}{4}$ phase pixels for both horizontal and vertical dimension, respectively. In other embodiments, the 2D, separable convoluting module 215 would include a convolutor that performs 1D convolution on the $+\frac{1}{4}$ phase pixel information and then performs 1D convolution on the $-\frac{1}{4}$ phase pixel information (or vice versa). In other embodiments, convolution module may perform convolution on information for alternating phase pixels. Convolution module 215 may have different configurations in other embodiments.

In one embodiment, the intensity and color values of a pixel are convoluted in filter 113 with the coefficients of the filter for up sampling. In other embodiments, only the intensity values would be convoluted by filter 113 with the other color components being up sampled by other methods. In other embodiments, the color values would be up sampled by convolution module 215 with different coefficients (or in a filter similar to filter 113). In still other embodiments, the color information (or intensity information in other embodiments) may be up sampled in a filter with a different number of taps. In other embodiment, the color information may be up sampled in different phases.

Figure 3:
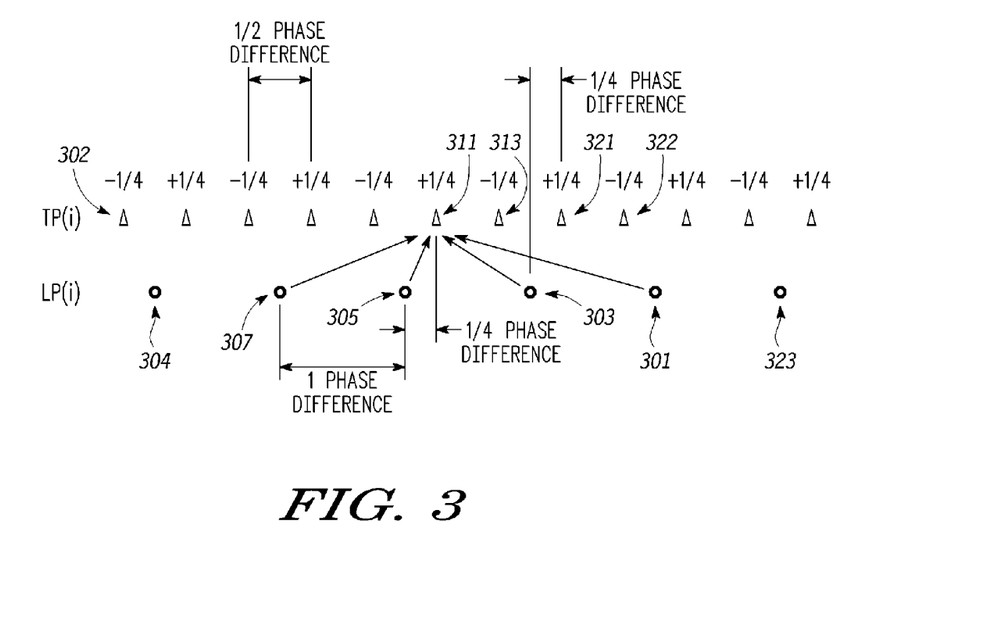
FIG. 3 is a graphic representation of up sampling in a horizontal direction according to one embodiment of the present invention.

FIG. 3 sets forth a graphic example of 1D horizontal up sampling performed by one embodiment of filter 113 and filter 131. In, one embodiment, TP(i) represents a sequence of higher resolution image units (the triangles in FIG. 3) of a temporary higher resolution image that holds an intermediate results for following up sampling in the vertical dimension. In one embodiment, the higher resolution image units may have the same number of bits as pixels LP(j) or a different number of bits in other embodiments. LP(j) represents the a sequence of pixels of a lower resolution image used to generate the pixels of the higher resolution image where the two images are of the same time frame. In the embodiment shown, pixel 304 represents the first lower resolution pixel to be considered.

In FIG. 3, the higher resolution image units are labeled either +¼ or −¼ to represent two phases of up sampled image units where the +¼ represents the positive ¼ phase relative to a lower resolution pixel and the −¼ represents a negative ¼ phase relative to a lower resolution pixel. In the embodiment shown, the higher resolution image units are located ½ phase spacings apart from each other and each are located a ¼ phase spacing from a lower resolution pixel. The lower resolution pixels are spaced a whole phase (sampling interval of the lower layer) difference apart from each other.

In the embodiment shown, information for a pair of +¼ phase and −¼ phase higher resolution image units is produced by up sampling the information of four lower resolution pixels. Hence, filter 113 includes a 1D 4-tap filter component where information for one higher resolution image unit is produced from information of four lower resolution image unit. Filter 113 is a polyphase filter in the embodiment shown in that it produces higher resolution pixels at different phases with respect to the lower resolution pixels.

In one embodiment, the information for each pixel includes an intensity value (e.g. Luma value) of the pixel, a color value (Croma U), and another color value (Croma V).

In the embodiment shown, the information for the higher resolution image units are produced from the lower resolution pixels by first convoluting the information of four lower resolution pixels in the horizontal dimension with the coefficients of the four tap filters (f(j)) according to the following formula:

$$TP(i)_{higherres} = \sum_{j=1}^{4} f(j) * LP(j)_{lowerres} \quad (1)$$

where i and j are both in the vertical direction

The intermediate result image data TP(i) are saved (e.g. in memory 216). Then, a final higher resolution image data HP(i) is then generated by convoluting the information of four intermediate image units in the vertical dimension with the coefficients of the four tap filters (f(j)) according to the following formula:

$$HP(i) = \sum_{j=1}^{4} f(j) * TP(j) \quad (2)$$

where i and j are both in the vertical direction.

Figure 4:
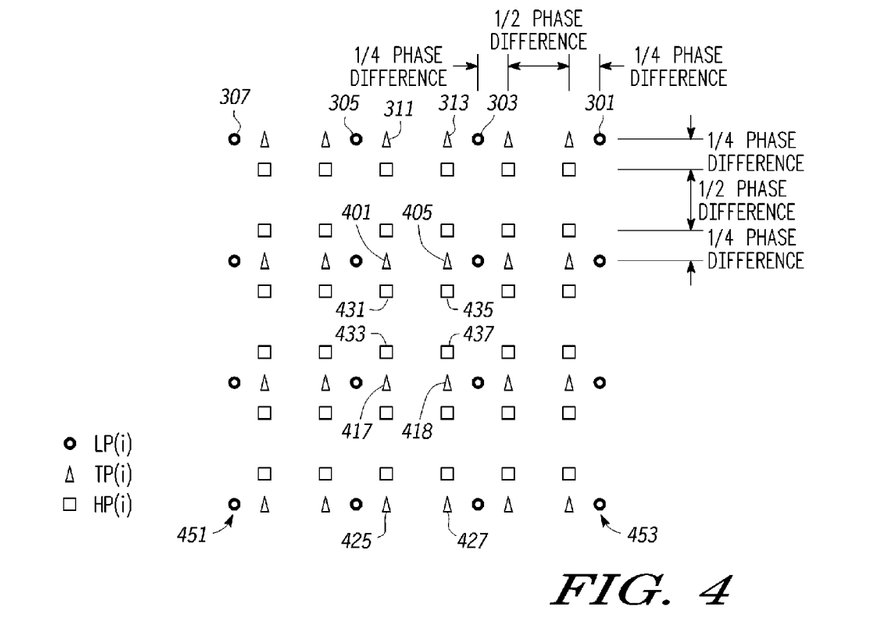
FIG. 4 is a graphic representation of up sampling in a horizontal and vertical direction according to one embodiment of the present invention.

FIG. 4 sets forth a graphic example of 2D up sampling performed by one embodiment of filter 113 and filter 131 in both the horizontal and vertical direction. In FIG. 4, the squares are the high resolution pixels HP(i) that are the result of a second up sampling on the intermediate image units (e.g. the triangles). In the embodiment of FIG. 4, each square is formed by the convoluting the information of four immediate image units in the vertical direction according to FIG. 2 above.

In one embodiment, the coefficients of f(j) are [−5, 31, 8, −2]/32 for the +¼ phase image units and [−2, 8, 31, −5]/32 for the −¼ phase pixels or image units for both the horizontal and vertical dimensions. The values of the four tap weights are represented here as normalized to 32 in both the horizontal and vertical dimension wherein the sum of the four weights equals 1. In other embodiments, the coefficient may be different in the horizontal direction from the vertical direction.

In the embodiment of FIG. 3, the information for +¼ phase image unit 311 and −¼ phase image unit 313 are produced by up sampling the information for pixels 307, 305, 303, and 301. In the embodiment with the coefficient weights given above, to produce the information for +¼ phase image unit 311, the information of pixel 307 is multiplied by −5, the information of pixel 305 is multiplied by 31, the information of pixel 303 is multiplied by 8, and the information of pixel 301 is multiplied by −2.

To produce the information for −¼ phase image unit 313 as per the weights given above, the information for pixel 307 is multiplied by −2, the information of pixel 305 is multiplied by 8, the information of pixel 303 is multiplied by 31, and the information of pixel 301 is multiplied by −5.

To produce the information for higher resolution image units 321 and 322, the information of lower resolution pixels 305, 303, 301, and 323 are utilized. The information of image unit 321 is produced by multiplying the information of pixel 305 by −5, multiplying the information of pixel 303 by 31, multiplying the information of pixel 301 by 8, and multiplying the information of pixel 323 by −2. To produce the information of image unit 322, the information of pixel 305 is multiplied by −2, the information of pixel 303 is multiplied by 8, the information of pixel 301 is multiplied by 31, and the information of pixel 323 is multiplied by −5.

Referring to FIG. 4, after higher resolution image units (TP(i)) are produced by up sampling in the horizontal direction, the higher resolution pixels (HP(i)) are produced by convoluting the higher resolution image units (TP(i)) in the vertical direction with the four coefficients [−5, 31, 8, −2]/32 for the +¼ phase pixels and [−2, 8, 31, −5]/32 for the −¼ phase pixels.

In the embodiment shown, the information of higher resolution +¼ phase pixel 431 is produced by multiplying the information of image unit 311 by −5, multiplying the information of image unit 401 by 31, multiplying the information of image unit 417 by 8, and multiplying the information of image unit 425 by −2. The information of higher resolution −¼ phase pixel 433 is produced by multiplying the information of image unit 311 by −2, multiplying the information of image unit 401 by 8, multiplying the information of image unit 417 by 31, and multiplying the information of image unit 425 by −5.

The information of higher resolution +¼ phase pixel 435 is produced by multiplying the information of image unit 313 by −5, multiplying the information of image unit 405 by 31, multiplying the information of image unit 418 by 8, and multiplying the information of image unit 427 by −2. The information of higher resolution −¼ phase pixel 437 is produced by multiplying the information of image unit 313 by −2, multiplying the information of image unit 405 by 8, multiplying the information of image unit 418 by 31, and multiplying the information of image unit 427 by −5.

In the embodiment shown, the resultant values for each higher resolution pixel (HP(i)) is then divided by 32×32 to obtain the final value for each higher resolution pixel.

In other embodiments, convoluting the information of the higher resolution pixels with the above given coefficients may be produced by other methods. For example, the information for each pixel may first be divided by 32 and then multiplied by the normalized numbers and added. Also in other embodiments, the nominator weights may first be divided by 32 before multiplication and then the four multiplied values are summed together. Also in other embodiments, the coefficients may be represented as scaled to another denominator value (e.g. 64). Also in other embodiments, the values of the intermediate image units (TP(i)) may be divided by 32 before being convoluted in the vertical direction with the four coefficients. In that embodiment, the sum from the final value for HP(i) would be divided by 32 instead of 32×32.

In one embodiment, the coefficients of filter 113 are convoluted with each of the intensity and two color values for a pixel. However, in other embodiments, the coefficients may be convoluted with less than all of the three values. For example, in one embodiment, the coefficients would be convoluted by the intensity value only. The other two color components would be up sampled by other up sampling methods. Also in other embodiments, other pixel values (e.g. other color values) may be convoluted with the coefficients.

In other embodiments, the 2D up sampling may be done concurrently e.g. by performing a 2D convolution. In one embodiment, filter 113 is a non-separable 2D filter. With a non separable filter, the filter would include four sets of 16 taps.

In one embodiment of a 2D non separable filter, for a $+\frac{1}{4}$ phase horizontal and $+\frac{1}{4}$ phase vertical, the 2D filter coefficients are defined as:

$$\begin{bmatrix} -5 \\ 31 \\ 8 \\ -2 \end{bmatrix} / 32 \times [\,-5\ \ 31\ \ 8\ \ -2\,]/32 = \tag{3}$$

$$\begin{bmatrix} 25 & -155 & -40 & 10 \\ -155 & 961 & 248 & -62 \\ -40 & 248 & 64 & -16 \\ 10 & -62 & -16 & 4 \end{bmatrix} / 32 \times 32$$

For a $+\frac{1}{4}$ phase horizontal and $-\frac{1}{4}$ phase vertical, the 2D filter coefficients are defined as:

$$\begin{bmatrix} -2 \\ 8 \\ 31 \\ -5 \end{bmatrix} / 32 \times [\,-5\ \ 31\ \ 8\ \ -2\,]/32 = \tag{4}$$

$$\begin{bmatrix} 10 & -62 & -16 & 4 \\ -40 & 248 & 64 & -16 \\ -155 & 961 & 248 & -62 \\ 25 & -155 & -40 & 10 \end{bmatrix} / 32 \times 32$$

For a $-\frac{1}{4}$ phase horizontal and $+\frac{1}{4}$ phase vertical, the 2D filter coefficients are defined as:

$$\begin{bmatrix} -5 \\ 31 \\ 8 \\ -2 \end{bmatrix} / 32 \times [\,-2\ \ 8\ \ 31\ \ -5\,]/32 = \tag{5}$$

$$\begin{bmatrix} 10 & -40 & -155 & 25 \\ -62 & 248 & 961 & -155 \\ -16 & 64 & 248 & -40 \\ 4 & -16 & -62 & 10 \end{bmatrix} / 32 \times 32$$

For a $-\frac{1}{4}$ phase horizontal and $-\frac{1}{4}$ phase vertical, the 2D filter coefficients are defined as:

$$\begin{bmatrix} -2 \\ 8 \\ 31 \\ -5 \end{bmatrix} / 32 \times [\,-2\ \ 8\ \ 31\ \ -5\,]/32 = \tag{6}$$

$$\begin{bmatrix} 4 & -16 & -62 & 10 \\ -16 & 64 & 248 & -40 \\ -62 & 248 & 961 & -155 \\ 10 & -40 & -155 & 25 \end{bmatrix} / 32 \times 32$$

Note that the four sets of 16 tap filter coefficients as given above are the resultant coefficients of a convolution of two 1D 4-tap filters in two dimensions. Thus, the resultant sets of coefficients filter given above are representative of a 2D separable filter (as described with the embodiments of FIGS. 3 and 4 above) or a 2D non separable filter.

To produce the information for the $+\frac{1}{4}$ phase, $+\frac{1}{4}$ phase pixel 431 in FIG. 4, the 16 lower resolution pixels (LP(i)) would be convoluted with the 16 coefficients in equation 3. In such an example, the information for pixel 307 would be multiplied by 25, the information of pixel 301 would be multiplied by 10, the information of 451 would by multiplied by 10, and the information of pixel 453 would be multiplied by 4. Although not explicitly described, the other lower resolution pixels would also be multiplied by the coefficients of the respective locations and summed. The resulted sum is then divided by 32×32.

To produce the information for the $+\frac{1}{4}$ phase, $-\frac{1}{4}$ phase pixel 433 in FIG. 4, the 16 lower resolution pixels (LP(i)) shown would be convoluted with the 16 coefficients in equation 4. To produce the information for the $-\frac{1}{4}$ phase, $+\frac{1}{4}$ phase pixel 435 in FIG. 4, the 16 lower resolution pixels (LP(i)) shown would be convoluted with the 16 coefficients in equation 5. To produce the information for the $-\frac{1}{4}$ phase, $-\frac{1}{4}$ phase pixel 437 in FIG. 4, the 16 lower resolution pixels (LP(i)) shown would be convoluted with the 16 coefficients in equation 6.

In some embodiments where a 2D nonseparable filter is implemented, intermediate image units TP(i) are not formed.

Although the above describes a filter that convolutes information on a pixel bases, in other embodiments, information may be convoluted on the basis of other image units.

In the embodiment described, the X direction is set forth in as the horizontal direction and the Y direction is the vertical direction. In other embodiments, convoluting in other directions may be utilized.

FIGS. 5-9 set forth test results demonstrating the effectiveness of a 2D, separable filter with a 1D 4-tap filter component having tap coefficients of [−5, 31, 8, −2] for the $+\frac{1}{4}$ phase image units and [−2, 8, 31, −5] for the $-\frac{1}{4}$ phase image units in both the horizontal and vertical directions ("4-tap filter") as compared to a conventional 2D separable filter with a 1D 6-tap filter having tap coefficients of [1, −4, 28, 9, 2, 0] for the $+\frac{1}{4}$ phase image units and [0, −2, 9, 28, −4, 1] for $-\frac{1}{4}$ phase image units in the horizontal and vertical directions ("6-tap filter").

Figure 5:
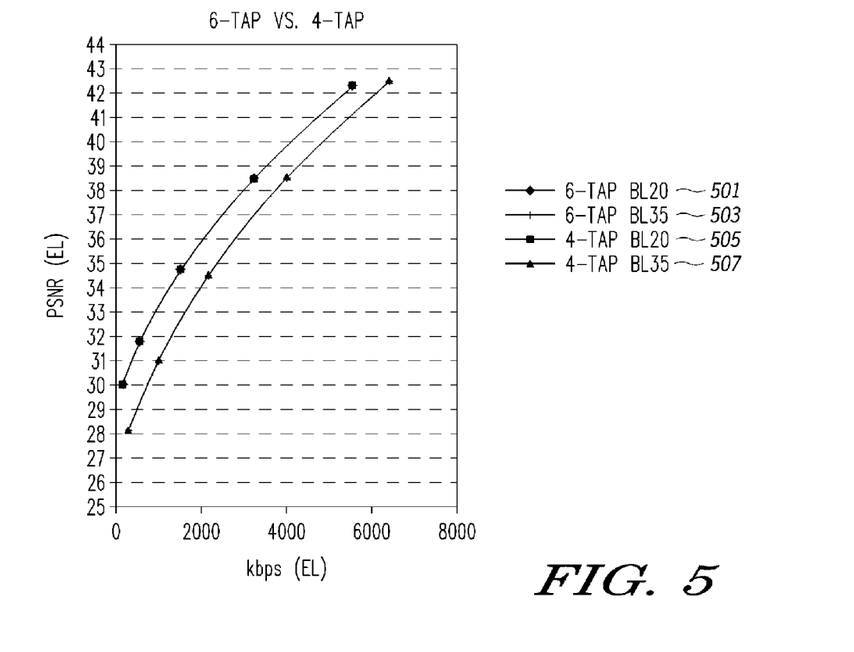
FIGS. 5-9 show graphs of test results comparing a filter according to one embodiment of the present invention with a convention prior art filter.

FIG. 5 sets forth coding efficiency results for simulations using a 4-tap filter described above with respect to the 6-tap filter described above for a first test case (Case #1). The images used for Case #1 had relatively complex scenes. The X-axis of FIG. 5 is the bit rate of the enhancement layer encoder (encoder 115) in kilobits per second (kbps). The Y axis of FIG. 5 is a quality assessment metric in terms of peak signal to noise ratio (PSNR) of the enhancement layer. FIG. 5 sets forth two simulations. One is where the quantization parameter of the base layer encoder 109 is 20 which corresponds to a bit rate of 1722.7536 kbps of the base layer encoder (BL Rate). The other simulation is where the quantization parameter of the base layer encoder 109 is 35 which corresponds to a bit rate of 353.0848 kbps of the base layer encoder. The data underlying the graph of FIG. 5 is shown in Appendix Table 1. The frame rate for the simulations was 30 frames per second. For the simulations, a 10-tap low pass filter was used for down sampling to produce the lower resolution base layer data.

As shown in FIG. 5, the PSNR line 505 (4-tap BL20) for the 4-tap filter simulation is very close to the PSNR line 501 (6-tap BL20) for the 6-tap filter simulation for the quantization parameter of 20 for the base layer encoder 109. Also shown in the graph of FIG. 5, the PSNR line 507 (4-tap BL35) for the 4-tap filter simulation is very close to the PSNR line 503 (6-tap BL35) for the 6-tap filter simulation for the quantization parameter of 35 for the base layer encoder 109.

Appendix Table 1 also shows results for quantization parameters of 25 and 30 for the base layer encoder 109. A quantization parameter of 25 corresponds to a base layer bit rate (BL R) of 1122.448 kbps and a quantization parameter of 30 corresponds to a base layer bite rate of 654.336 kbps. Appendix table 1 also sets forth the total bit rate (Total R) which is the enhancement layer (EL Rate) bit rate plus the base layer bit rate (BL Rate).

Figure 6:
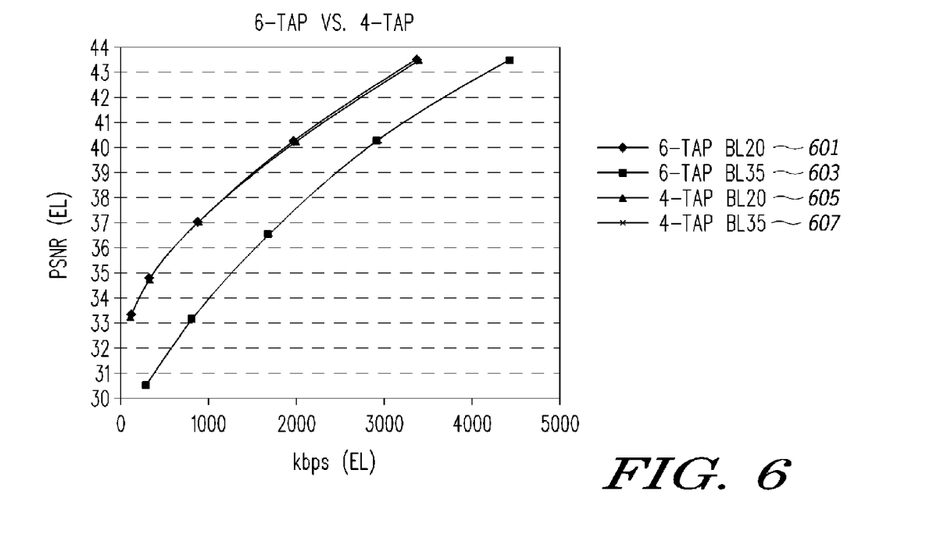

FIG. 6 sets forth a graph of the results for Case #2. The data underlying the graph of FIG. 6 is set forth in Appendix Table 2. In Case #2, the content of the video used is less complex than the video used for Case #1. The video for Case #2 included images with areas having less contrast.

As shown in FIG. 6, the PSNR line 607 for the 4-tap filter simulation is very close to the PSNR line 603 for the 6-tap filter simulation for the quantization parameter of 35 of the base layer encoder 109. The results for base layer quantization parameter of 20 show that the PSNR line 605 for the 4-tap filter simulation is very close to the PSNR line 601 for the 6-tap filter simulation at the lower enhancement layer bit rates (e.g. less than 2000 kbps). At higher enhancement layer bit rates (e.g. above 3000 kbps), there is an up to 0.2 dB degradation for the performance of the 4-tap filter from the performance of the 6-tap filter.

Figure 7:
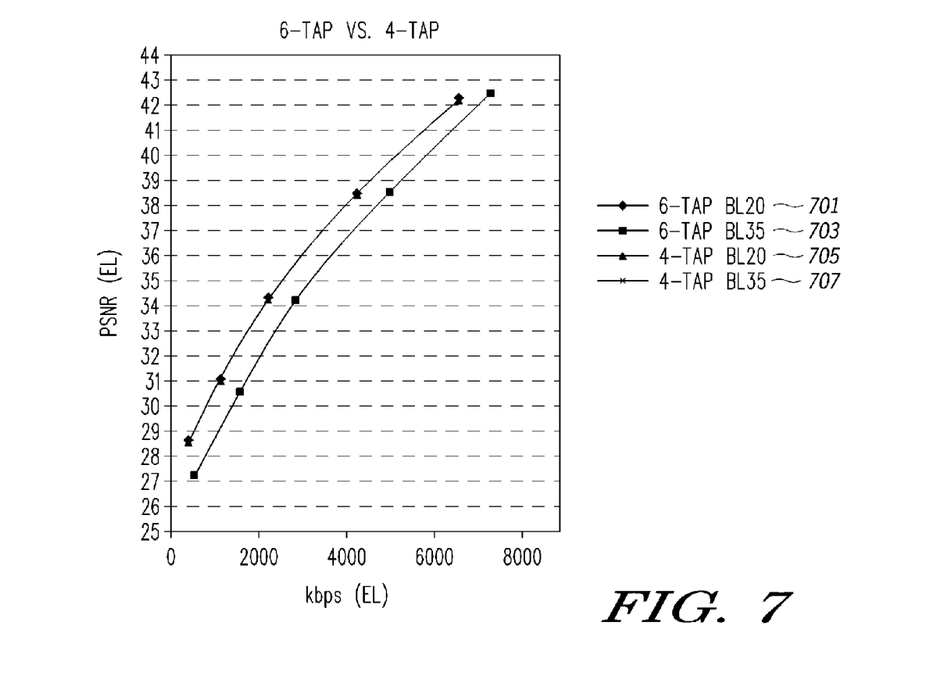

FIG. 7 sets forth the results for Case #3. The video for Case #3 used images with a background scene closer to that of Case #1 than Case #2. The data underlying the graph of FIG. 7 is set forth in Appendix Table 3. As shown in FIG. 7, the PSNR line 705 for the 4-tap filter simulation is very close to the PSNR line 701 for the 6-tap filter simulation for the quantization parameter of 20 of the base layer encoder 109. Also shown in the graph of FIG. 7, the PSNR line 707 for the 4-tap filter simulation is very close to the PSNR line 703 for the 6-tap filter simulation for the quantization parameter of 35 of the base layer encoder 109.

Figure 8:
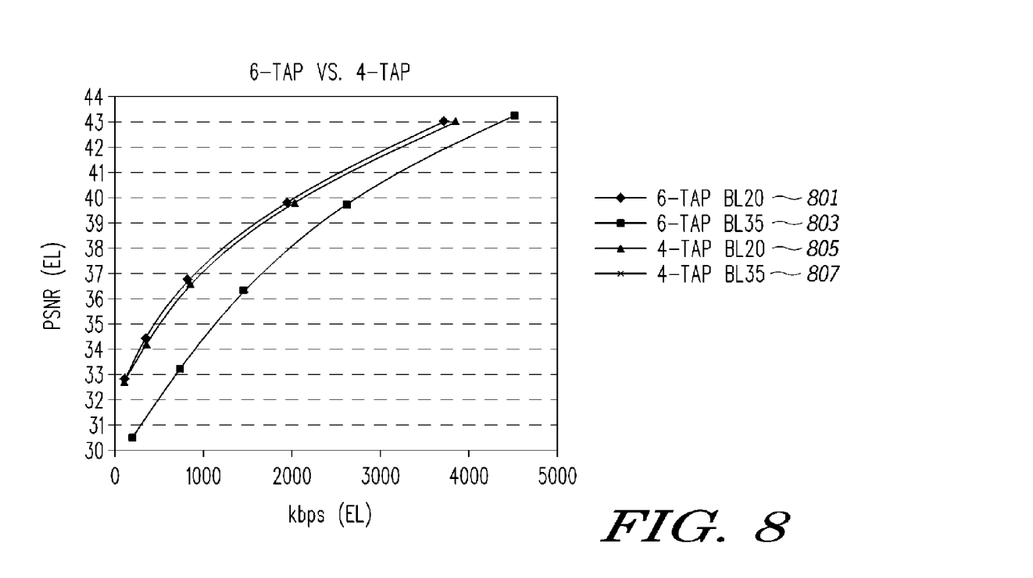

FIG. 8 sets forth a graph of the results for Case #4. The data underlying the graph of FIG. 8 is set forth in Appendix Table 4. In Case #4, the content of the video is less complex than the video used for Cases #1, #2, and #3. The video for Case #4 includes images with an area having less contrast than the video for Cases #1, #2, and #3.

As shown in FIG. 8, the PSNR line 807 for the 4-tap filter simulation is very close to the PSNR line 803 for the 6-tap filter simulation for the quantization parameter of 35 of the base layer encoder 109. The results for base layer quantization parameter of 20 show that there is an up to 0.2 dB degradation with the 4-tap filter (line 805) as opposed to the 6-tap filter (line 801).

Figure 9:
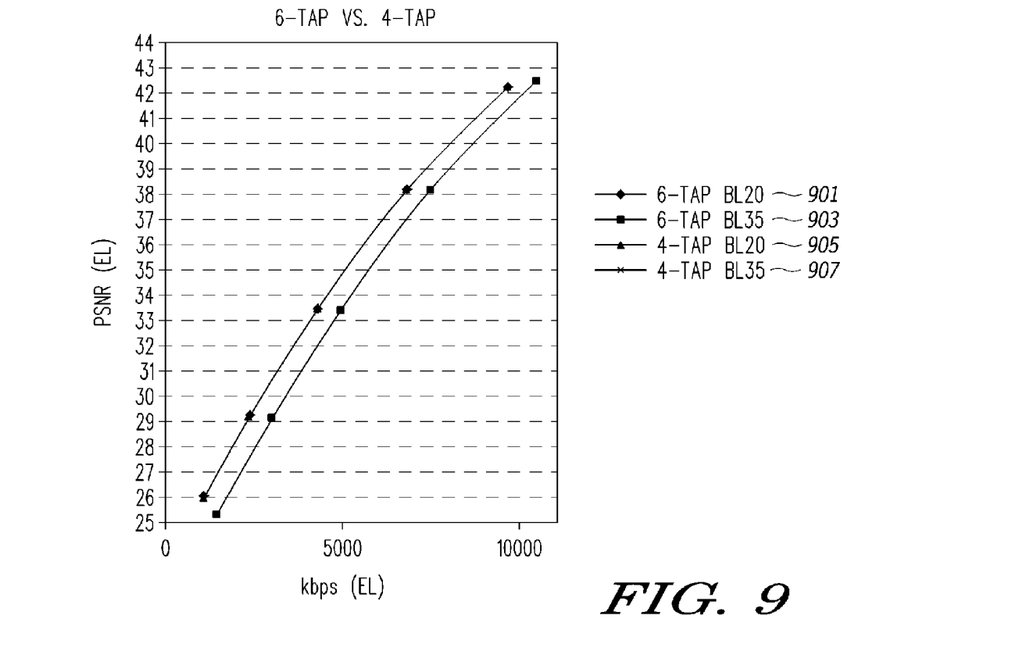

FIG. 9 sets forth a graph of the results of Case #5. The data underlying the graph of FIG. 9 is set forth in Appendix Table 5. In Case #5, the content of the video is similar in complexity to that of Case #1 and Case #3. As shown in FIG. 9, the PSNR line 905 for the 4-tap filter simulation is very close to the PSNR line 901 for the 6-tap filter simulation for the quantization parameter of 20 of the base layer encoder 109. Also shown in the graph of FIG. 9, the PSNR line 907 for the 4-tap filter simulation is very close to the PSNR line 903 for the 6-tap filter simulation for the quantization parameter of 35 of the base layer encoder 109.

As shown from the results set forth in FIGS. 5-9 and Appendix Tables 1-5, the differences in performance between the conventional filter and the 4-tap filter is negligible for Cases #1, #3, and #5. For Cases #2 and #4 which have images with a less complex scene, there was a 0.2 dB degradation or less for simulations with the base layer quantization parameter of 20 for the higher enhancement layer bit rates. For cases #2 and #4, the performance between the two filters was negligible for simulations having a base layer quantization parameter of 35. Accordingly, the poly phase 2D filter with two 1D 4-tap filtering used above provides performance that is very comparable if not negligible in most instances from a conventional 2D filter with 2 1D 6-tap filtering.

Furthermore, utilizing a filter a 1D 4-tap filter component in each direction instead of a conventional 6-tap filter reduces the complexity of the codec of the interlayer prediction module (e.g. 11 and 129). In some embodiments where the up sampling filter is implemented in hardware, this reduction in complexity may result in a reduction in total circuitry and/or a reduction in power consumption due to the filter having less taps. In some embodiments where the up sampling filter is implemented in software, the reduction in taps of the filter may result in a reduction in processor computations, a reduction in power, and/or a reduction in memory requirements.

Accordingly, the embodiments set forth above provide for a filter that obtains the benefits of less complexity with a negligible or nearly negligible reduction in performance from a filter having a greater number of taps in the 1D dimension.

Furthermore, using a multiphase filter in one embodiment, may provide for better coding efficiency over single phase up sampling filters.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

APPENDIX TABLE 1

| | Case #1 | | | | | |
|---|---|---|---|---|---|---|
| BL QP = 20 6-tap EL QP | BL Rate 1722.7536 Total R | EL Rate | BL PSNR 42.7226 EL PSNR | 4-tap Total R | EL Rate | EL PSNR |
| 20 | 7295.136 | 5572.382 | 42.4133 | 7300.562 | 5577.808 | 42.4087 |
| 25 | 5081.4128 | 3358.659 | 38.5501 | 5084.363 | 3361.61 | 38.5417 |
| 30 | 3298.3936 | 1575.64 | 34.7004 | 3288.998 | 1566.245 | 34.6829 |

APPENDIX TABLE 1-continued

| | | | Case #1 | | | |
|---|---|---|---|---|---|---|
| 35 | 2286.6976 | 563.944 | 31.8166 | 2270.338 | 547.584 | 31.8205 |
| 40 | 1857.52 | 134.7664 | 29.9303 | 1851.104 | 128.3504 | 29.9923 |

| | BL R | | BL PSNR | | | |
|---|---|---|---|---|---|---|
| BL QP = 25 | 1122.448 | | 38.5447 | | | |
| EL QP | Total R | EL Rate | EL PSNR | Total R | EL Rate | EL PSNR |
| 20 | 6964.1808 | 5841.733 | 42.4551 | 6977.746 | 5855.298 | 42.455 |
| 25 | 4720.6208 | 3598.173 | 38.5468 | 4732.899 | 3610.451 | 38.5426 |
| 30 | 2872.256 | 1749.808 | 34.565 | 2874.997 | 1752.549 | 34.5466 |
| 35 | 1742.8112 | 620.3632 | 31.4812 | 1731.093 | 608.6448 | 31.4587 |
| 40 | 1266.0768 | 143.6288 | 29.5495 | 1259.214 | 136.7664 | 29.5807 |

| | BL R | | BL PSNR | | | |
|---|---|---|---|---|---|---|
| BL QP = 30 | 654.336 | | 34.386 | | | |
| EL QP | Total R | EL Rate | EL PSNR | Total R | EL Rate | EL PSNR |
| 20 | 6793.488 | 6139.152 | 42.5313 | 6804.171 | 6149.835 | 42.5331 |
| 25 | 4533.1824 | 3878.846 | 38.5814 | 4546.682 | 3892.346 | 38.5832 |
| 30 | 2676.5808 | 2022.245 | 34.528 | 2684.555 | 2030.219 | 34.518 |
| 35 | 1455.5728 | 801.2368 | 31.1246 | 1453.008 | 798.672 | 31.0989 |
| 40 | 834.344 | 180.008 | 28.8088 | 828.1872 | 173.8512 | 28.8002 |

| | BL R | | BL PSNR | | | |
|---|---|---|---|---|---|---|
| BL QP = 35 | 353.0848 | | 30.8376 | | | |
| EL QP | Total R | EL Rate | EL PSNR | Total R | EL Rate | EL PSNR |
| 20 | 6726.9232 | 6373.838 | 42.6274 | 6735.158 | 6382.074 | 42.6317 |
| 25 | 4465.0784 | 4111.994 | 38.6459 | 4472.483 | 4119.398 | 38.6481 |
| 30 | 2628.9952 | 2275.91 | 34.5506 | 2637.29 | 2284.205 | 34.5466 |
| 35 | 1392.1744 | 1039.09 | 31.0584 | 1396.72 | 1043.635 | 31.0458 |
| 40 | 664.5472 | 311.4624 | 28.148 | 662.8384 | 309.7536 | 28.126 |

APPENDIX TABLE 2

| | | | Case #2 | | | |
|---|---|---|---|---|---|---|
| BL = 20 | BL Rate | | BL PSNR | | | |
| 6-tap | 1730.736 | | 43.1295 | 4-tap | | |
| EL QP | Total R | EL Rate | EL PSNR | Total R | EL Rate | EL PSNR |
| 20 | 5337.7136 | 3606.978 | 43.628 | 5386.0704 | 3655.334 | 43.5688 |
| 25 | 3748.2672 | 2017.531 | 40.293 | 3773.5968 | 2042.861 | 40.2351 |
| 30 | 2597.0048 | 866.2688 | 37.0695 | 2600.632 | 869.896 | 37.0132 |
| 35 | 2045.7328 | 314.9968 | 34.8507 | 2040.1424 | 309.4064 | 34.7786 |
| 40 | 1839.2352 | 108.4992 | 33.3553 | 1832.0048 | 101.2688 | 33.2971 |

| | BL Rate | | BL PSNR | | | |
|---|---|---|---|---|---|---|
| BL = 25 | | | | | | |
| 6-tap | 1142.6496 | | 39.1136 | | | |
| EL QP | Total R | EL Rate | EL PSNR | Total R | EL Rate | EL PSNR |
| 20 | 5092.7248 | 3950.075 | 43.6025 | 5144.8176 | 4002.168 | 43.5517 |
| 25 | 3471.1824 | 2328.533 | 40.2411 | 3499.1168 | 2356.467 | 40.182 |
| 30 | 2193.264 | 1050.614 | 36.6128 | 2202.0528 | 1059.403 | 36.5587 |
| 35 | 1497.016 | 354.3664 | 34.1084 | 1492.8368 | 350.1872 | 34.0281 |
| 40 | 1256.088 | 113.4384 | 32.6665 | 1248.7328 | 106.0832 | 32.6099 |

| | BL Rate | | BL PSNR | | | |
|---|---|---|---|---|---|---|
| BL = 30 | | | | | | |
| 6-tap | 677.3088 | | 35.1289 | | | |
| EL QP | Total R | EL Rate | EL PSNR | Total R | EL Rate | EL PSNR |
| 20 | 5002.248 | 4324.939 | 43.5989 | 5052.7088 | 4375.4 | 43.57 |
| 25 | 3347.3408 | 2670.032 | 40.219 | 3373.3952 | 2696.086 | 40.167 |
| 30 | 2035.448 | 1358.139 | 36.5194 | 2045.3968 | 1368.088 | 36.4709 |
| 35 | 1194.112 | 516.8032 | 33.2693 | 1195.584 | 518.2752 | 33.2199 |
| 40 | 816.6208 | 139.312 | 31.4499 | 810.2736 | 132.9648 | 31.3825 |

| | BL Rate | | BL PSNR | | | |
|---|---|---|---|---|---|---|
| BL = 35 | | | | | | |
| 6-tap | 381.376 | | 31.9458 | | | |
| EL QP | Total R | EL Rate | EL PSNR | Total R | EL Rate | EL PSNR |
| 20 | 5000.7264 | 4619.35 | 43.623 | 5044.808 | 4663.432 | 43.6193 |
| 25 | 3319.9696 | 2938.594 | 40.2125 | 3347.2608 | 2965.885 | 40.1843 |
| 30 | 1989.8928 | 1608.517 | 36.4832 | 2002.888 | 1621.512 | 36.4442 |

APPENDIX TABLE 2-continued

| | | | Case #2 | | | |
|---|---|---|---|---|---|---|
| 35 | 1124.2608 | 742.8848 | 33.1729 | 1129.7552 | 748.3792 | 33.1323 |
| 40 | 625.512 | 244.136 | 30.4503 | 625.2256 | 243.8496 | 30.3922 |

APPENDIX TABLE 3

| | | | Case #3 | | | |
|---|---|---|---|---|---|---|
| 6-tap QP = 20 EL QP | BL Rate 2141.912 Total R | EL Rate | BL PSNR 42.552 EL PSNR | 4-tap Total R | EL Rate | EL PSNR |
| 20 | 8659.694 | 6517.782 | 42.38 | 8652.486 | 6510.574 | 42.3754 |
| 25 | 6363.418 | 4221.506 | 38.471 | 6351.462 | 4209.55 | 38.4695 |
| 30 | 4466.595 | 2324.683 | 34.4025 | 4445.773 | 2303.861 | 34.402 |
| 35 | 3260.453 | 1118.541 | 31.0774 | 3237.52 | 1095.608 | 31.0952 |
| 40 | 2606.333 | 464.4208 | 28.4701 | 2587.797 | 445.8848 | 28.5029 |
| BL QP = 25 EL QP | BL Rate 1472.646 Total R | EL Rate | BL PSNR 38.1964 EL PSNR | Total R | EL Rate | EL PSNR |
| 20 | 8218.371 | 6745.725 | 42.3969 | 8216.155 | 6743.509 | 42.3949 |
| 25 | 5907.581 | 4434.934 | 38.4688 | 5904.106 | 4431.459 | 38.4646 |
| 30 | 3958.371 | 2485.725 | 34.2929 | 3948.221 | 2475.574 | 34.2843 |
| 35 | 2650.024 | 1177.378 | 30.827 | 2631.131 | 1158.485 | 30.8216 |
| 40 | 1950.758 | 478.112 | 28.2202 | 1932.578 | 459.9312 | 28.2362 |
| BL QP = 30 EL QP | BL Rate 920.1568 Total R | EL Rate | BL PSNR 33.8248 EL PSNR | Total R | EL Rate | EL PSNR |
| 20 | 7934.419 | 7014.262 | 42.4412 | 7935.8 | 7015.643 | 42.4402 |
| 25 | 5603.566 | 4683.41 | 38.487 | 5604.949 | 4684.792 | 38.4831 |
| 30 | 3645.854 | 2725.698 | 34.2721 | 3643.862 | 2723.706 | 34.2629 |
| 35 | 2272.112 | 1351.955 | 30.5708 | 2262.997 | 1342.84 | 30.553 |
| 40 | 1447.093 | 526.936 | 27.7337 | 1432.688 | 512.5312 | 27.7223 |
| BL QP = 35 EL QP | BL Rate 534.8912 Total R | EL Rate | BL PSNR 30.112 EL PSNR | Total R | EL Rate | EL PSNR |
| 20 | 7787.963 | 7253.072 | 42.5152 | 7795.155 | 7260.264 | 42.5141 |
| 25 | 5438.282 | 4903.39 | 38.526 | 5445.547 | 4910.656 | 38.5263 |
| 30 | 3479.202 | 2944.31 | 34.2801 | 3484.038 | 2949.147 | 34.2767 |
| 35 | 2095.776 | 1560.885 | 30.5344 | 2097.658 | 1562.766 | 30.5203 |
| 40 | 1200.469 | 665.5776 | 27.3382 | 1195.89 | 660.9984 | 27.3149 |

APPENDIX TABLE 4

| | | | Case #4 | | | |
|---|---|---|---|---|---|---|
| BL QP = 20 6-tap EL QP | BL R 1403.013 Total R | EL Rate | BL PSNR 43.1379 EL PSNR | 4-tap Total R | EL Rate | EL PSNR |
| 20 | 5234.427 | 3831.414 | 43.0616 | 5323.443 | 3920.43 | 43.0391 |
| 25 | 3379.555 | 1976.542 | 39.7105 | 3450.586 | 2047.573 | 39.6571 |
| 30 | 2203.397 | 800.384 | 36.7146 | 2247.488 | 844.4752 | 36.5816 |
| 35 | 1700.968 | 297.9552 | 34.4438 | 1692.619 | 289.6064 | 34.1679 |
| 40 | 1480.099 | 77.0864 | 32.7471 | 1476.149 | 73.136 | 32.6568 |
| BL QP = 25 EL QP | BL R 903.9136 Total R | EL Rate | BL PSNR 39.4748 EL PSNR | Total R | EL Rate | EL PSNR |
| 20 | 5005.998 | 4102.085 | 43.0723 | 5077.426 | 4173.512 | 43.0588 |
| 25 | 3132.779 | 2228.866 | 39.665 | 3187.741 | 2283.827 | 39.6288 |
| 30 | 1853.926 | 950.0128 | 36.3912 | 1893.64 | 989.7264 | 36.3211 |
| 35 | 1233.184 | 329.2704 | 33.9246 | 1232.254 | 328.3408 | 33.7132 |
| 40 | 985.5856 | 81.672 | 32.2408 | 981.0144 | 77.1008 | 32.1505 |

APPENDIX TABLE 4-continued

Case #4

| BL QP = 30 | BL R 550.7504 | | BL PSNR 35.7681 | | | |
|---|---|---|---|---|---|---|
| EL QP | Total R | EL Rate | EL PSNR | Total R | EL Rate | EL PSNR |
| 20 | 4897.35 | 4346.6 | 43.1013 | 4939.6 | 4388.85 | 43.0982 |
| 25 | 3017.968 | 2467.218 | 39.6836 | 3051.616 | 2500.866 | 39.6642 |
| 30 | 1732.76 | 1182.01 | 36.3348 | 1757.203 | 1206.453 | 36.2886 |
| 35 | 1001.093 | 450.3424 | 33.3478 | 1005.758 | 455.008 | 33.243 |
| 40 | 655.0752 | 104.3248 | 31.3399 | 649.6336 | 98.8832 | 31.2577 |

| BL QP = 35 | BL R 334.9952 | | BL PSNR 32.2926 | | | |
|---|---|---|---|---|---|---|
| EL QP | Total R | EL Rate | EL PSNR | Total R | EL Rate | EL PSNR |
| 20 | 4830.565 | 4495.57 | 43.1345 | 4845.571 | 4510.576 | 43.14 |
| 25 | 2969.75 | 2634.755 | 39.7229 | 2985.416 | 2650.421 | 39.7212 |
| 30 | 1702.907 | 1367.912 | 36.3584 | 1719.035 | 1384.04 | 36.3367 |
| 35 | 968.1936 | 633.1984 | 33.2666 | 975.8944 | 640.8992 | 33.2145 |
| 40 | 528.6912 | 193.696 | 30.4095 | 526.8912 | 191.896 | 30.3446 |

APPENDIX TABLE 5

Case #5

| 6-tap BL QP 20 | | BL Rate 3349.24 | BL PSNR 42.5441 | 4-tap | | |
|---|---|---|---|---|---|---|
| EL QP | Total R | EL Rate | EL PSNR | Total R | EL Rate | EL PSNR |
| 20 | 13708.256 | 10359.02 | 42.3147 | 13727.68 | 10378.44 | 42.318 |
| 25 | 10556.0144 | 7206.774 | 38.0392 | 10569.54 | 7220.304 | 38.0386 |
| 30 | 7762.7056 | 4413.466 | 33.4536 | 7762.549 | 4413.309 | 33.4399 |
| 35 | 5719.384 | 2370.144 | 29.3448 | 5702.638 | 2353.398 | 29.3186 |
| 40 | 4389.8992 | 1040.659 | 25.9553 | 4358.186 | 1008.946 | 25.9345 |

| BL QP 25 | | BL Rate 2458.88 | BL PSNR 37.8697 | | | |
|---|---|---|---|---|---|---|
| EL QP | Total R | EL Rate | EL PSNR | Total R | EL Rate | EL PSNR |
| 20 | 13006.2608 | 10547.38 | 42.3442 | 13022.97 | 10564.09 | 42.3523 |
| 25 | 9860.6448 | 7401.765 | 38.0584 | 9875.55 | 7416.67 | 38.0619 |
| 30 | 7032.9296 | 4574.05 | 33.4329 | 7038.981 | 4580.101 | 33.4244 |
| 35 | 4914.0496 | 2455.17 | 29.2794 | 4898.218 | 2439.338 | 29.2516 |
| 40 | 3533.4464 | 1074.566 | 25.8627 | 3501.502 | 1042.622 | 25.8376 |

| BL QP 30 | | BL Rate 1656.936 | BL PSNR 33.0581 | | | |
|---|---|---|---|---|---|---|
| EL QP | Total R | EL Rate | EL PSNR | Total R | EL Rate | EL PSNR |
| 20 | 12451.744 | 10794.81 | 42.3967 | 12472.23 | 10815.3 | 42.4034 |
| 25 | 9313.9088 | 7656.973 | 38.0969 | 9326.706 | 7669.77 | 38.102 |
| 30 | 6496.1584 | 4839.222 | 33.445 | 6506.048 | 4849.112 | 33.4436 |
| 35 | 4319.0672 | 2662.131 | 29.2015 | 4314.717 | 2657.781 | 29.1798 |
| 40 | 2835.8144 | 1178.878 | 25.6563 | 2811.155 | 1154.219 | 25.6206 |

| BL QP 35 | | BL Rate 1030.901 | BL PSNR 28.7886 | | | |
|---|---|---|---|---|---|---|
| EL QP | Total R | EL Rate | EL PSNR | Total R | EL Rate | EL PSNR |
| 20 | 12131.6512 | 11100.75 | 42.4776 | 12153.51 | 11122.6 | 42.4874 |
| 25 | 8992.1632 | 7961.262 | 38.1609 | 9011.858 | 7980.957 | 38.1682 |
| 30 | 6194.5744 | 5163.674 | 33.4987 | 6213.43 | 5182.53 | 33.5009 |
| 35 | 4016.7408 | 2985.84 | 29.2012 | 4025.827 | 2994.926 | 29.1931 |
| 40 | 2451.4032 | 1420.502 | 25.445 | 2446.87 | 1415.97 | 25.411 |

What is claimed is:

1. A method for up sampling image data comprising:
forming image information for a first image unit, wherein the forming image information for the first image unit includes convoluting in a first direction the image information for a subset of four image units of a plurality of image units with a first set of four coefficients;
forming image information for a second image unit, the second image unit being spaced apart in the first direction by less than a whole phase difference from the first image unit with respect to the subset of four image units, wherein the forming the second image unit includes convoluting in the first direction the image information for the subset of four image units with a second set of four coefficients, wherein the first set of four coefficients is different from the second set of four coefficients;
wherein the plurality of image units are of a first image resolution and the first image unit and the second image unit are for a second image resolution, wherein the second image resolution is of a higher image resolution than the first image resolution.

2. The method of claim 1 further comprising:
forming image information for a third image unit from image information for a subset of four image units including the first image unit, wherein the forming image information for the third image unit includes convoluting in a second direction the image information for the subset of four image units including the first image unit with a third set of four coefficients;
forming image information for a fourth image unit from the image information for the subset of four image units including the first image unit, the fourth image unit being spaced apart in the second direction by less than a whole phase difference from the third image unit with respect to the subset of four image units, wherein the forming the fourth image unit includes convoluting in the second direction the image information for the subset of four image units including the first image unit with a fourth set of four coefficients, wherein the third set of four coefficients is different from the fourth set of four coefficients.

3. The method of claim 2 wherein the first set of four coefficients and the third set of four coefficients are the same, wherein the second set of four coefficients and the fourth set of coefficients are the same.

4. The method of claim 1 wherein:
wherein the convoluting includes multiplying image information for each of the four image units by a different one of the four coefficients of the first set;
wherein the convoluting includes multiplying image information for each of the four image units by a different one of the four coefficients of the second set.

5. The method of claim 1 wherein the image information formed for the first image unit includes an intensity value, the image information formed for the second image unit includes an intensity value, and the image information convoluted for each of the image units of the subset includes an intensity value.

6. The method of claim 1 wherein the image information formed for the first image unit includes a color value, the image information formed for the second image unit includes a color value, and the image information convoluted for each of the image units of the subset includes a color value.

7. The method of claim 1 wherein the subset of four image units are characterized as pixels.

8. The method of claim 1 wherein the first set of coefficients is [−5, 31, 8, −2]/32 and the second set of coefficients is [−2, 8, 31, −5]/32.

9. The method of claim 1 wherein the subset of four image units is a series of spaced apart image units in the first direction, wherein the first image unit has a phase difference of ¼ with respect to the second of the series of spaced apart image units in the first direction and the second image unit is has a phase difference of ¾ with respect to the second of the series of spaced apart image units in the first direction.

10. The method of claim 1 wherein:
forming image information for a third image unit from image information for a second subset of four image units of the plurality of image units, wherein the forming image information for the third image unit includes convoluting the image information in a first direction for the second subset of four image units with the first set of four coefficients;
forming image information for a fourth image unit from the image information for the second subset of four image units, the fourth image unit being spaced apart by less than a whole phase difference from the third image unit with respect to the second subset of image units, wherein the forming the fourth image unit includes convoluting in the first direction the image information for the second subset of four image units with the second set of four coefficients.

11. A method of forming image information for a plurality of data image units of a first image resolution from image information for a plurality of subsets of four image units of a plurality of image units of a second image resolution, wherein the first image resolution is a higher resolution than the second image resolution, the method comprising:
forming image information for each of a first subset of the plurality of data image units of the first image resolution by convoluting in a first direction image information for a subset of the plurality of subsets of four image units with a first set of four coefficients;
forming image information for each of a second subset of the plurality of data image units of the first image resolution by convoluting in the first direction image information for a subset of a plurality of subsets of four image units with a second set of four coefficients, wherein the second set of coefficients is different from the first set of coefficients.

12. The method of claim 11 further comprising:
forming image information for each of a first subset of a plurality of image units of a third image resolution by convoluting in a second direction image information for a subset of a plurality of subsets of four image units of the a first subset of the plurality of image units of the first image resolution with a third set of four coefficients;
forming image information for each of a second subset of a plurality of image units of the third image resolution by convoluting in a second direction image information for a subset of a plurality of subsets of four image units of the a second subset of the plurality of image units of the first image resolution with a fourth set of four coefficients, the first direction being perpendicular to the second direction.

13. The method of claim 12 wherein the first set of four coefficients and the third set of four coefficients are the same, wherein the second set of four coefficients and the fourth set of coefficients are the same.

14. The method of claim 11 wherein:
the image information formed for each of the first subset of the plurality of image units of the first image resolution includes an intensity value for the each image unit of the first subset;
the image information formed for each of the second subset of the plurality of image units of the first image resolution includes an intensity value for the each image unit of the second subset;
wherein the image information convoluted for each subset of the plurality of subsets of four image units includes an intensity value for each image unit of the subset of the four image units.

15. The method of claim 11 wherein each image unit of the plurality of image units of the first image resolution is spaced apart in the first direction by ¼ phase difference from an image unit of the plurality of image units of the second image resolution.

16. The method of claim 11 further comprising:
generating the image information for the plurality of image units of the second image resolution from a first video sequence;

using information generated from the image information formed for the plurality of image units of the first image resolution to provide prediction information for producing a bit stream from a second video sequence, wherein the second video sequence is of a higher resolution than the first video sequence.

17. The method of claim 11 further comprising:

generating the image information for the plurality of image units of the second image resolution from a video bit stream;

using the image information formed for the plurality of image units of the first image resolution to generate information to provide prediction information for reconstructing image data from the video bit stream.

18. A filter for image up sampling, comprising:

an input to receive image information for each of a first plurality of image units;

an output to provide image information for each of a second plurality of image units;

a convolution module having a first input coupled to the input, the convolution module convoluting in a first direction image information for each of a subset of four image units of the first plurality of image units with a first set of four coefficients to produce image information for a first image unit, and the convoluting module convoluting in the first direction image information for each of the subset of four image units with a second set of four coefficients to produce image information for a second image unit, wherein the first set of coefficients and the second set of coefficients are different, wherein the plurality of image units are of a first image resolution and the first image unit and the second image unit are for a second image resolution, wherein the second image resolution is of a higher image resolution than the first image resolution.

19. The filter of claim 18 wherein the first set of coefficients is [−5, 31, 8, −2]/32 and the second set of coefficients is [−2, 8, 31, −5]/32.

20. The filter of claim 18 wherein the image information for each image unit of the subset of four image units includes an intensity value for the image unit, the image information for the first image unit includes an intensity value for the first image unit, and the image information for the second image unit includes intensity information for the second image unit.

* * * * *